United States Patent [19]

Baryla

[11] Patent Number: 5,717,468
[45] Date of Patent: Feb. 10, 1998

[54] SYSTEM AND METHOD FOR DYNAMICALLY RECORDING AND DISPLAYING COMMENTS FOR A VIDEO MOVIE

[75] Inventor: Michael Francis Baryla, Endwell, N.Y.

[73] Assignee: International Business Machines Corporation, Armonk, N.Y.

[21] Appl. No.: 347,997

[22] Filed: Dec. 2, 1994

[51] Int. Cl.⁶ .......................... H04N 5/445; H04N 9/76; G11B 27/00; G09G 5/40

[52] U.S. Cl. .......................... 348/563; 345/116; 348/589; 348/600; 348/722; 360/13; 369/83; 386/52

[58] Field of Search .......................... 348/552, 563, 348/564, 571, 584, 585, 586, 589, 659, 722, 578, 600; 358/311; 360/14.1, 13; 369/83; 345/113, 114, 115, 116, 112; 395/135, 155, 161; H04N 5/222, 5/445, 9/74, 9/76, 9/79

[56] References Cited

U.S. PATENT DOCUMENTS

| | | | |
|---|---|---|---|
| 3,899,662 | 8/1975 | Kreeger et al. | 395/138 |
| 4,599,611 | 7/1986 | Bowker et al. | 348/589 X |
| 4,616,336 | 10/1986 | Robertson et al. | 395/147 |
| 4,631,521 | 12/1986 | El-Sherbini | 358/427 |
| 4,674,040 | 6/1987 | Barker et al. | 395/600 |
| 4,716,404 | 12/1987 | Tabata et al. | 345/201 |
| 4,780,761 | 10/1988 | Daly et al. | 348/408 |
| 4,791,598 | 12/1988 | Liou et al. | 364/725 |
| 4,846,694 | 7/1989 | Erhardt | 434/365 |
| 4,899,292 | 2/1990 | Montagna et al. | 364/521 |
| 4,928,253 | 5/1990 | Yamauchi et al. | 345/201 |
| 4,999,709 | 3/1991 | Yamazaki et al. | 348/589 |
| 5,008,854 | 4/1991 | Maeda et al. | 348/552 X |
| 5,018,082 | 5/1991 | Obata et al. | 395/154 |
| 5,029,112 | 7/1991 | Sakamoto et al. | 395/118 |
| 5,065,345 | 11/1991 | Knowles et al. | 395/154 |
| 5,081,449 | 1/1992 | Kurosu et al. | 345/115 |
| 5,101,197 | 3/1992 | Hix et al. | 345/87 |
| 5,123,088 | 6/1992 | Kasahara et al. | 395/159 |
| 5,138,700 | 8/1992 | Kinoshita | 395/161 |
| 5,146,552 | 9/1992 | Cassorla et al. | 395/145 |
| 5,150,458 | 9/1992 | Masuzaki et al. | 395/135 |
| 5,167,021 | 11/1992 | Needham | 395/275 |
| 5,191,410 | 3/1993 | McCalley et al. | 348/13 |
| 5,195,092 | 3/1993 | Wilson et al. | 370/94.2 |
| 5,214,758 | 5/1993 | Ohba et al. | 395/164 |
| 5,237,627 | 8/1993 | Johnson et al. | 382/198 |
| 5,262,765 | 11/1993 | Tsumura et al. | 345/122 |
| 5,264,933 | 11/1993 | Rosser et al. | 348/578 |
| 5,303,311 | 4/1994 | Epting et al. | 382/197 |
| 5,424,785 | 6/1995 | Orphan | 348/552 X |
| 5,502,727 | 3/1996 | Catanzaro et al. | 395/135 |

FOREIGN PATENT DOCUMENTS

| | | | |
|---|---|---|---|
| 3-264992 | 11/1991 | Japan | G09G 5/00 |
| 4-277793 | 10/1992 | Japan | G09G 5/40 |

OTHER PUBLICATIONS

IBM Technical Disclosure Bulletin Vol. 28, No. 4, 9/85, "Method For Creating Annotation Data", by Barker et al.
S.N. 08/065,720, filed May 21, 1993, Tuttle.
S.N. 08/285,390, filed Aug. 3, 1994, Greer et al.
"Computer Science", Dec. 1993 (FJ 9639 (84079) Comparison Of International Standards For Lossless Still Image Compression, by Arps et al.

*Primary Examiner*—Glenton B. Burgess
*Assistant Examiner*—John W. Miller
*Attorney, Agent, or Firm*—Arthur J. Samodovitz

[57] ABSTRACT

A method and system produces a digital video with comments. The system controls play of a digital video and pauses the video in response to contemporaneous reviewer request to comment on a frame currently being played in the video. In response to user input of comments for the current or paused frame, the system displays the comments with the paused frame, stores the comments and links the comments to the current or paused frame. In response to reviewer request to continue play of the video after the pause, the system continues play of the video without the comments. The system also pauses the video when the comments are displayed during the subsequent play of the digital video.

20 Claims, 4 Drawing Sheets

| FRAME # | COMMENTOR'S NAME | COMMENT TEXT |
|---|---|---|
| 4100 | JOHN | PLEASE PROVIDE EXAMPLE |
| 7613 | MARY | THE EXPLANATION IS TOO TECHNICAL |
| | | |
| | | |
| | | |

1

SYSTEM AND METHOD FOR DYNAMICALLY RECORDING AND DISPLAYING COMMENTS FOR A VIDEO MOVIE

BACKGROUND OF THE INVENTION

The invention relates generally to digital video production systems and deals more particularly with a method and system for receiving and presenting comments for the digital video.

During the course of producing a digital video, it is often helpful to obtain comments from other people. The comments may relate to a specific scene comprising a set of contiguous frames of the digital video, and a reviewer may wish to recommend that the specific scene be deleted, corrected or replaced. For example, a reviewer may wish to recommend that a specific scene of a digital video movie be deleted because the scene is too violent, or the reviewer may wish to recommend that a specific scene of a teaching video be replaced to provide a different explanation. After receiving the comments, the producer may then correct the digital video. It is important in many cases for the reviewer to clearly specify the scene to which the comments relate.

A general object of the present invention is to provide a system which permits the reviewer to make comments relating to the digital video and readily and accurately correlate the comments to a specific scene in the digital video.

SUMMARY OF THE INVENTION

The invention resides in a method and system for producing a digital video with comments. The system controls play of a digital video and pauses the video in response to contemporaneous reviewer request to comment on a frame currently being played in the video. In response to user input of comments for the current or paused frame, the system displays the comments with the paused frame, stores the comments and links the comments to the current or paused frame. In response to reviewer request to continue play of the video after the pause, the system continues play of the video without the comments. The system also pauses the video when the comments are displayed during the subsequent play of the digital video.

DETAILED DESCRIPTION OF THE PREFERRED EMBODIMENT

Figures 1, 2:
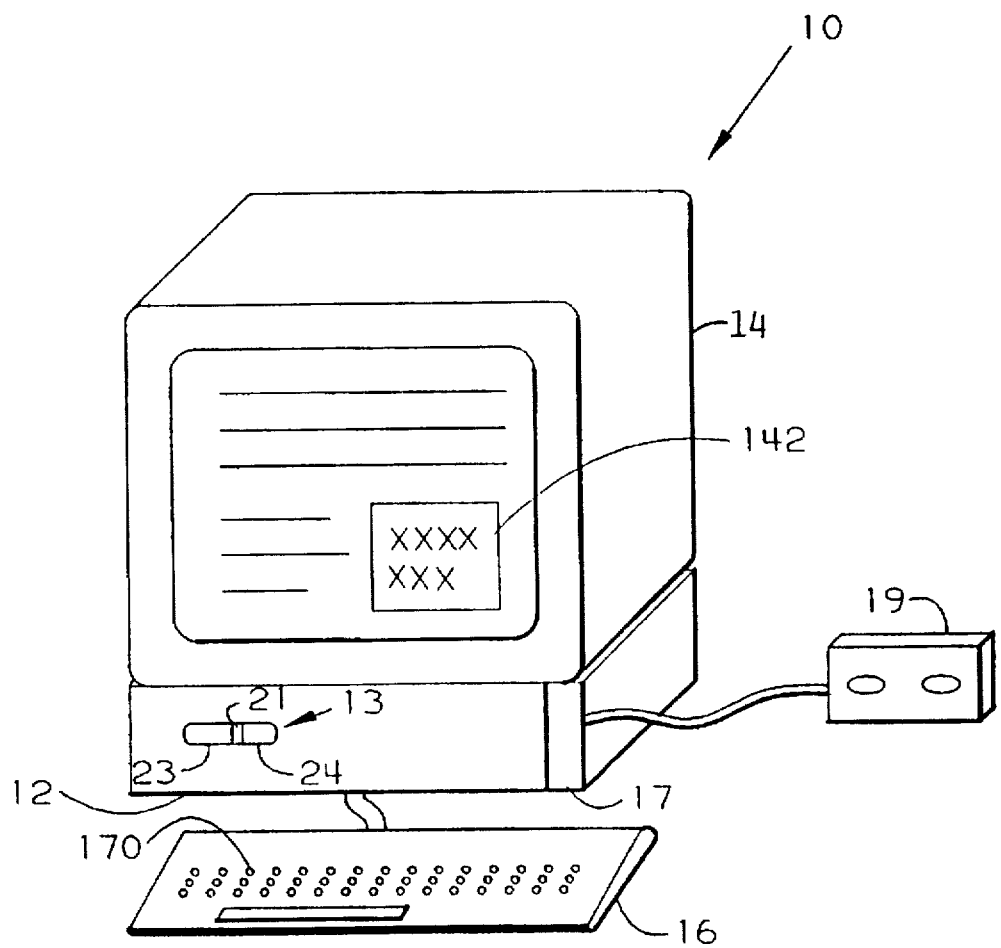
FIG. 1 is diagram of a digital video interactive commenting system according to the present invention.
FIG. 2 illustrates a comment file stored in memory of the system of FIG. 1.

Referring now to the figures in detail wherein like reference numbers indicate like elements throughout, FIG. 1 illustrates a digital video interactive commenting system generally designated 10. System 10 comprises a personal computer 12 such as an IBM PS/2 (TM) personal computer with an IBM OS/2 (TM) operating system, a "hard" disk 13, a monitor 14 and a keyboard 16. System 10 also comprises a previously known IBM Action Media II card 17 which converts an analog video tape 19 to digital frames of a digital video 21, for example, in DVI form. ("DVI" form of digital video is provided by an Intel Corporation circuit within the Action Media II card.) Alternately, the digitizing can be performed by another system and the resultant digitized video read into the hard disk 13 from a floppy disk or LAN connection. The resultant digital video 21 is stored on hard disk 13. System 10 also comprises a previously known IBM Audio Visual Connection (AVC) program (and associated device driver) 23 which controls basic operation of the digital video 21, i.e. playing the video, counting frames which have been played to determine the frame number of the current frame, determining when a previously specified frame is currently being played, pausing the video upon request, etc. In accordance with the present invention, a program routine 20 initiates the playing of the digital video 21 and overlays specified frames of the digital video 21 with previously stored comments 22. A program routine 24 adds comments to specified frames of the digital video 21, as described in more detail below.

FIG. 2 illustrates a table 34 which contains the stored comments 22. The first column of the table lists the frame number at which the comment text should be displayed. The second column lists the name of the person/reviewer who made the comment; the name is also displayed with the comment text. The third column lists the actual comment text.

Figure 3:
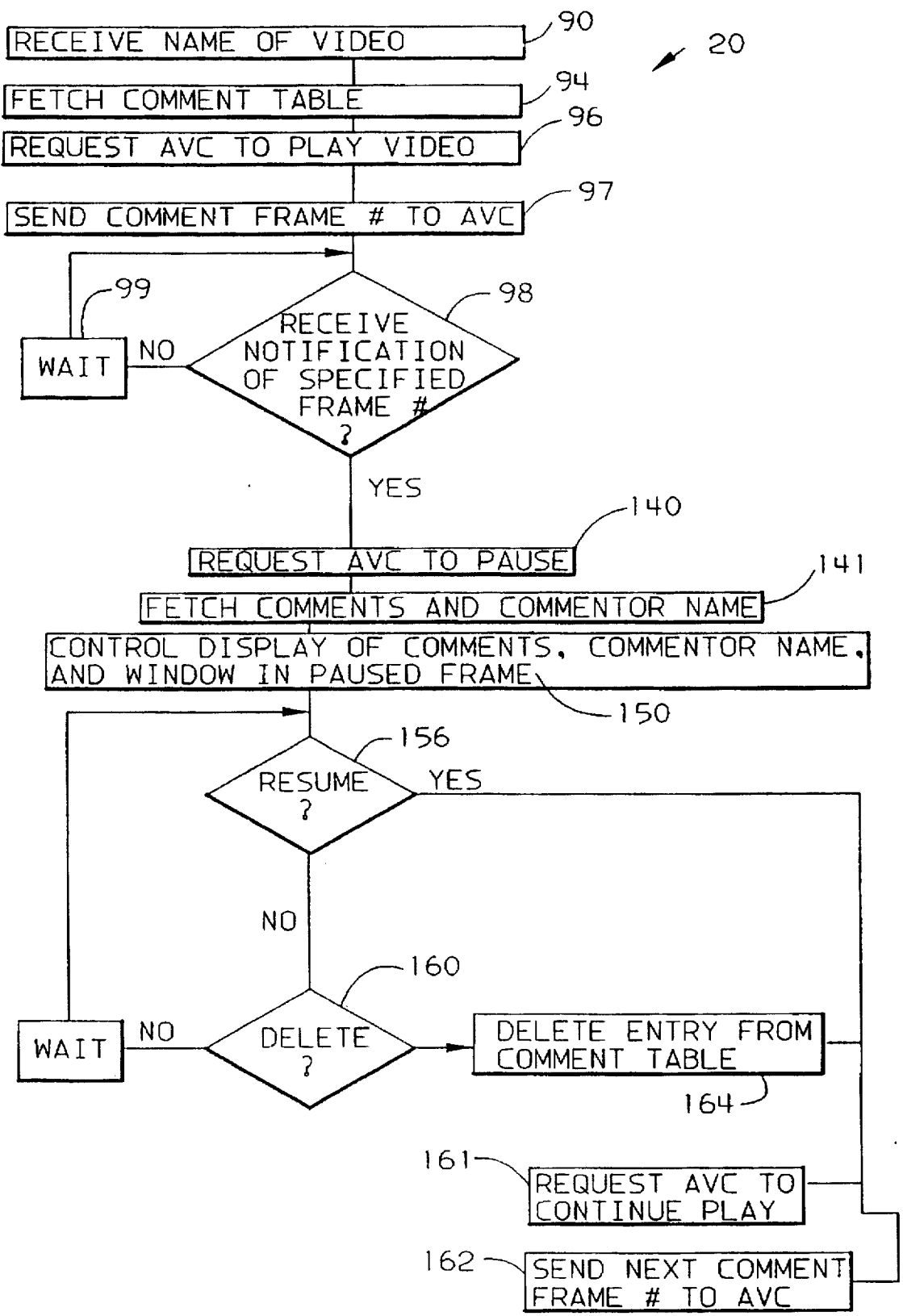
FIG. 3 is a flow chart illustrating a program according to the present invention within the system of FIG. 1 for initiating play of a digital video and overlaying the digital video with previously stored comments.

FIG. 3 illustrates the program or routine 20 for initiating play of the digital video and overlaying a commented frame with a window, previously stored comments 22 and the reviewer's name. In step 90, the reviewer types in and program 20 receives the name of the digital video to be played. In response, the program 20 fetches a previously stored comment file/table 34, if any, for the named video (step 94). Then, program 20 requests the AVC program to begin playing the identified video 21 from the beginning (step 96). Assuming there is a previously stored comment file, program 20 reads the file to determine the frames at which comments apply (the entries are stored in order of frame number), and sends the first frame number in the file to the AVC program 23 (step 97). Then, program 20 waits until notification from the AVC program that the specified frame number is currently being played (decision 98 and step 99).

In response to the play request from program 20, AVC program 23 (or an equivalent program and associated hardware) initializes, i.e. sets to zero, a frame counter (step 100). Next, AVC program 23 starts playing the digital video by fetching and displaying the first frame stored in the hard disk 13 (step 102). When the frame is displayed, the frame counter is incremented (step 110). After the frame counter is incremented, AVC program 23 compares the current frame count to the frame number previously specified by program 20. If there is not a match (decision 120), then AVC program 23 loops back to step 102 to display the next frame. Steps 102, 110 and 120 are repeated as described above until a current frame number matches the frame number specified by program 20. At that time, AVC program 23 notifies program 20 (step 124), and program 20 requests that the AVC program pause the digital video, i.e. continue to display the current frame (step 140). Because of internal delays in processing the notification from the AVC program and processing the pause request from program 20, and the limited resolution and inaccuracy of the device driver in determining a specific frame position while playing, the current frame may be several frames beyond the specified frame, but this is not a problem because the video scene is not likely to change so rapidly. Next, program 20 fetches the comments and reviewer name from the comment table for the specified frame (step 141), overrides a portion of the displayed frame with a window 142, and displays the comment text and commentor name in the window 142 (step 150). Program 20 builds the window from a stored image and requests AVC to overlay the window on the paused video.

The paused frame with the associated window, comments and reviewer name continues to be displayed until the user strikes a resume function key 154 on the keyboard (decision 156) or strikes a delete function key 158 on the keyboard (decision 160). In the former case, program 20 requests the AVC program 23 to continue to play the video 21 after the paused frame without the comments, commentor name or window that were displayed during the pause (step 161) and sends the AVC program the frame number of the next entry, if any, in the comment table (step 162). In the latter case, program 20 deletes the entry from the comment file for the comments that were displayed during the pause (step 164), requests the AVC program to continue to play the video 21 after the paused frame without the deleted comments, commentor name or window (step 161) and then sends the AVC program the frame number of the next entry (step 162), if any, in the comment table.

Figure 5:
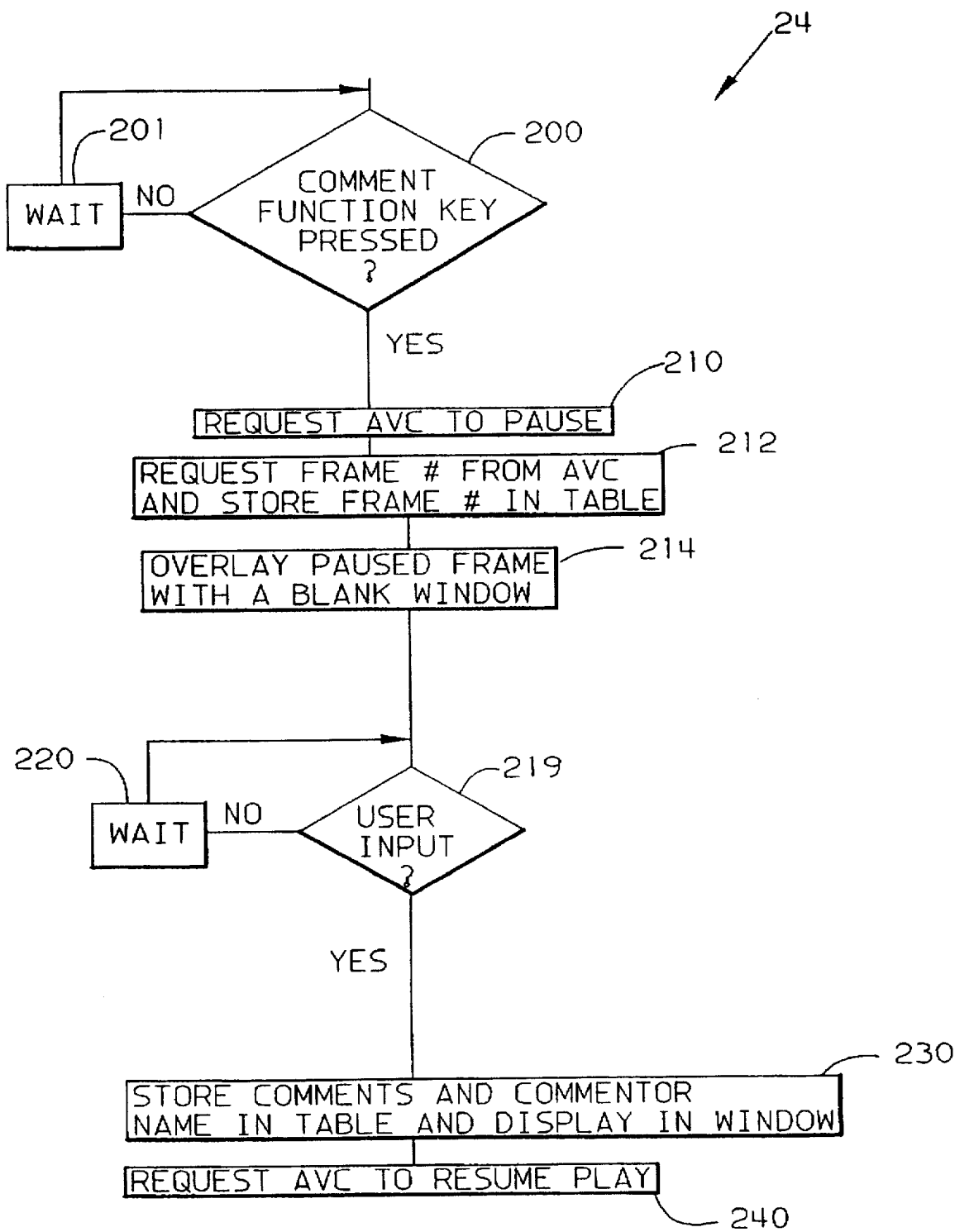
FIG. 5 is a flow chart illustrating a program according to the present invention within the system of FIG. 1 for dynamically adding comments to the previously stored comments or dynamically making an original set of comments.

The foregoing process involving the AVC program 23 and program 20 continues as described above for the remainder of the digital video 21 unless a reviewer strikes a comment function key 170 (decision 200 and step 201 illustrated in FIG. 5). Pressing of the comment function key 170 invokes program (or routine) 24 which requests the AVC program 23 to pause the video (step 210). Next, program 24 requests the frame number from AVC program 23 (step 212) and stores the frame number, overlays a portion of the digital video with a blank window (step 214), and then waits for input from the reviewer (decision 219 and step 220). The reviewer then types in the reviewer's name and the actual comments (which then appear in the window 142), and program 24 stores the name and actual comments in the comment file 22 (step 230). Finally, program 24 requests the AVC program to resume playing the video after the paused frame without the comments, reviewer name or window that were displayed during the paused state (step 240). Program 20 will be invoked again if a subsequent frame number has previously stored comments. Comment adder program 24 will be invoked again for a subsequent frame if the commentor signals to add comments to a subsequent frame.

Figure 4:
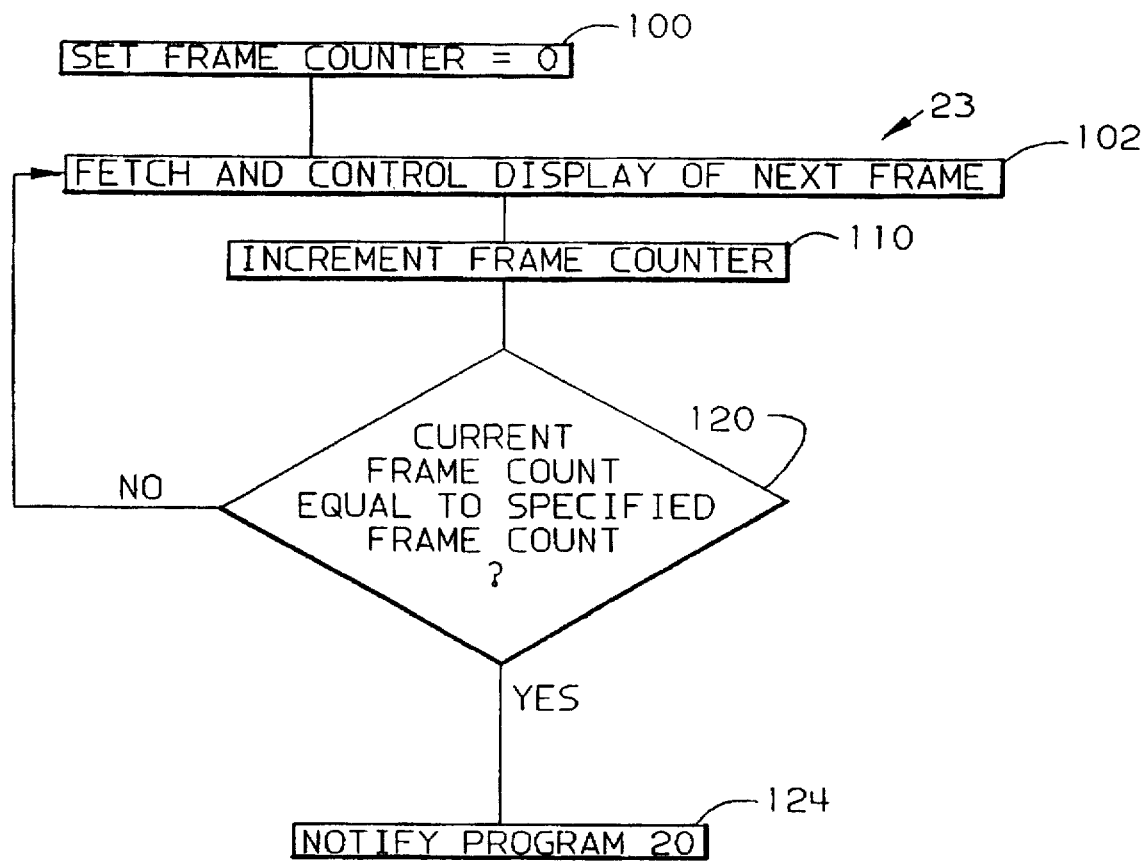
FIG. 4 is a flow chart illustrating a previously known IBM AVC program within the system of FIG. 1 for playing the digital video.

During the next complete play of the digital video, the digital video will pause to display the comments entered as described above with reference to FIG. 5, as well as any previously stored comments, if not deleted, as described above with reference to FIG. 4. Also during the next play, additional comments can be made and stored in the comment table as described above with reference to FIG. 5. The original digital video itself, stored on hard disk 13, is not changed.

Based on the foregoing, a digital video interactive commenting system has been disclosed. However, numerous substitutions and modifications can be made without deviating from the scope of the present invention. Therefore, the present invention has been disclosed by way of illustration and not limitation and reference should be made to the following claims to determine the scope of the present invention.

I claim:

1. A system for producing a digital video movie with comments, said system comprising:

means for controlling play of a digital video movie;

means for pausing said video movie in response to a contemporaneous request by a reviewer to comment on a frame currently being played in said video movie; and means, responsive to said comment for the current or paused frame, for storing said comment, linking said comment to said current or paused frame and displaying said comment approximately at said current or paused frame during subsequent play of said digital video movie.

2. A system as set forth in claim 1 wherein said reviewer makes said comment via a key board during said pause and the displaying means displays said comment as said comment is entered via said keyboard, and further comprising means, responsive to reviewer request to continue play of said video movie after said pause, to continue play of said video movie without said comment.

3. A system as set forth in claim 1 further comprising means for automatically pausing said video movie when said comment is displayed during said subsequent play of said video movie.

4. A system as set forth in claim 3 further comprising means, responsive to reviewer request to continue play of said video movie after said pause in said subsequent play, to continue play of said video movie without said comment.

5. A method as set forth in claim 3 wherein said comment is displayed during said subsequent play of said video movie for enough time to permit a viewer to read said comment.

6. A system as set forth in claim 1 wherein said linking means comprises means for determining an identification of said current or paused frame.

7. A system as set forth in claim 6 wherein said linking means comprises means for storing said identification in conjunction with said comment.

8. A system as set forth in claim 1 wherein said linking and displaying means comprise means for determining a frame number of said current or paused frame when said current or paused frame is being played and storing said frame number in conjunction with said comment.

9. A system as set forth in claim 8 wherein said determining means monitors frame numbers of said video as said video movie is being played.

10. A method for producing a video movie with comments, said method comprising the steps of:

controlling play of a video movie;

pausing said video movie in response to a contemporaneous request by a reviewer to comment on a frame currently being played in said video movie; and in response to said comment for the current or paused frame, storing said comment, linking said comment to said current or paused frame and displaying said comment approximately at said current or paused frame during subsequent play of said video movie.

11. A method as set forth in claim 10 wherein said reviewer makes said comment via a key board during said pause and said comment is displayed as said comment is entered via said keyboard, and further comprising the step of continuing to play said video movie without said comment in response to reviewer request to continue play of said video movie after said pause.

12. A method as set forth in claim 10 further comprising the step of pausing said video movie when said comment is displayed during said subsequent play of said video movie.

13. A method as set forth in claim 12 further comprising the step of continuing to play said video movie without said comment in response to reviewer request to continue play of said video movie after said pause in said subsequent play.

14. A system as set forth in claim 12 wherein said comment is displayed during said subsequent play of said video movie for enough time to permit a viewer to read said comment.

15. A method as set forth in claim 10 wherein said linking step comprises the step of determining an identification of said current or paused frame.

16. A method as set forth in claim 15 wherein said linking step comprises the step of storing said identification in conjunction with said comment.

17. A method as set forth in claim 10 wherein said linking and displaying steps comprise the step of determining a frame number of said current or paused frame when said current or paused frame is being played and storing said frame number in conjunction with said comment.

18. A method as set forth in claim 17 wherein said determining step comprises the step of monitoring frame numbers of said video movie as said video movie is being played.

19. A computer program product for producing a video movie with comments, said program product comprising:

a computer readable medium;

first program instruction means for instructing a processor to controll play of a video movie;

second program instruction means for instructing a processor to pause said video movie in response to a contemporaneous request by a reviewer to comment on a frame currently being played in said video movie; and third program instruction means, responsive to said comment for the current or paused frame, for instructing a processor to store said comment, link said comment to said current or paused frame and display said comment approximately at said current or paused frame during subsequent play of said video movie; and wherein said first, second and third program instruction means are recorded on said medium.

20. A program product as set forth in claim 19 further comprising fourth program instruction means for instructing a processor to pause said video movie when said comment is displayed during said subsequent play of said video movie.

* * * * *